United States Patent [19]

Cubalchini

[11] Patent Number: 4,483,377

[45] Date of Patent: Nov. 20, 1984

[54] METHOD AND APPARATUS FOR PRESSURIZING HYDROPNEUMATIC SHOCK ABSORBERS

[75] Inventor: Joseph Cubalchini, St. Charles, Ill.

[73] Assignee: Maremont Corporation, Carol Stream, Ill.

[21] Appl. No.: 567,135

[22] Filed: Dec. 30, 1983

Related U.S. Application Data

[63] Continuation-in-part of Ser. No. 398,707, Jul. 15, 1982, abandoned, which is a continuation-in-part of Ser. No. 389,598, Jun. 18, 1982, abandoned.

[51] Int. Cl.³ .................................................. F16F 9/00
[52] U.S. Cl. ................................ 141/349; 188/322.21; 267/64.28; 277/3

[58] Field of Search ............... 141/3, 4, 20, 98, 311 R, 141/329, 349, 350, 352, 353, 354, 355, 392; 188/322.16, 322.17, 322.18, 322.21; 267/64.28; 277/3

[56] References Cited

U.S. PATENT DOCUMENTS

Re. 28,329  2/1975  Nicholls .......................... 188/322.16
4,364,457  12/1982  Wössner et al. ................ 188/322.17

Primary Examiner—Stephen Marcus
Assistant Examiner—M. J. Thronson
Attorney, Agent, or Firm—Allegretti, Newitt, Witcoff & McAndrews, Ltd.

[57] ABSTRACT

An apparatus for hydropneumatically pressurizing a shock absorber is disclosed. A gas charging device mechanically deflects a gas seal for introducing gas under pressure to the damping chambers of the shock absorber.

7 Claims, 2 Drawing Figures

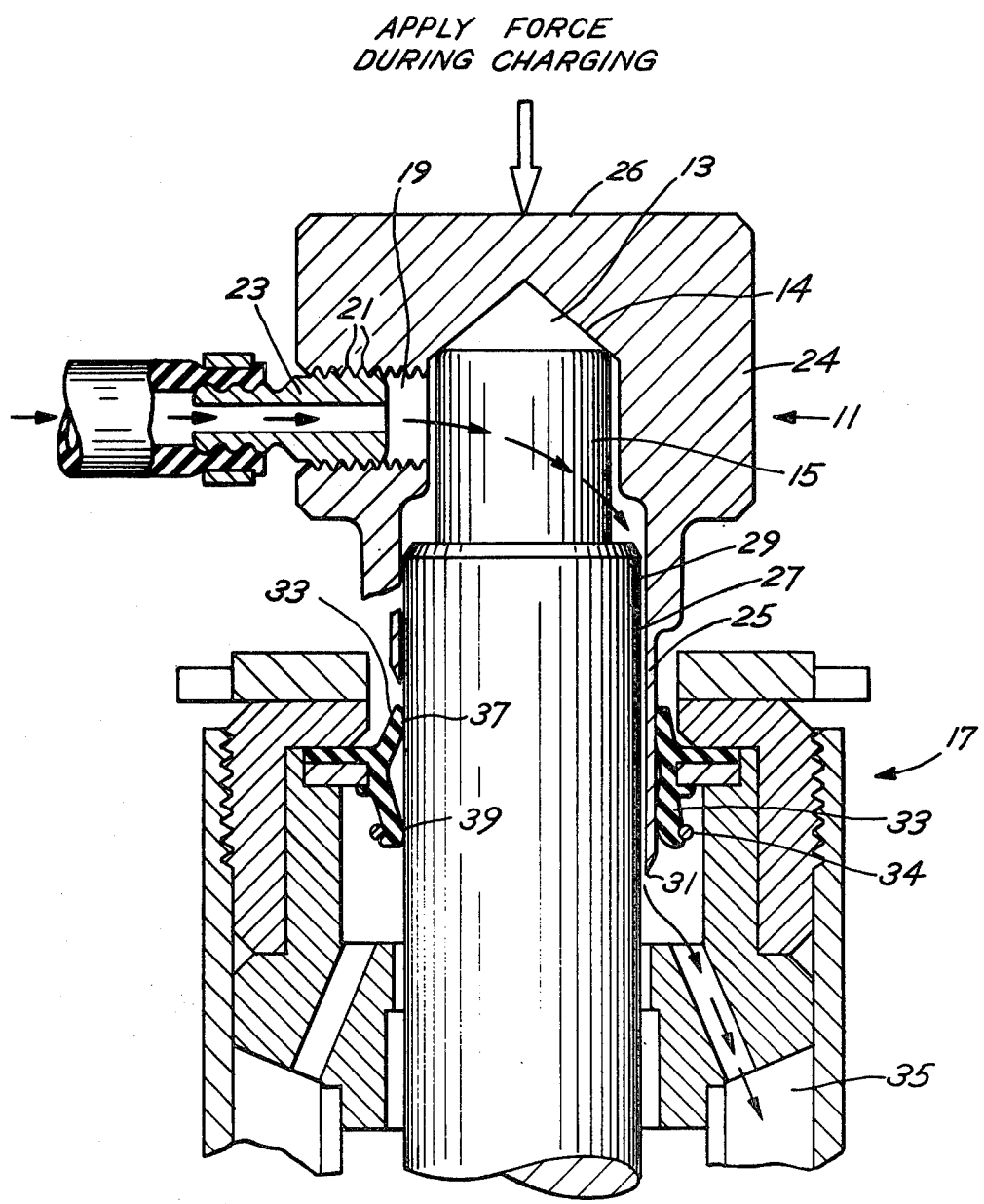

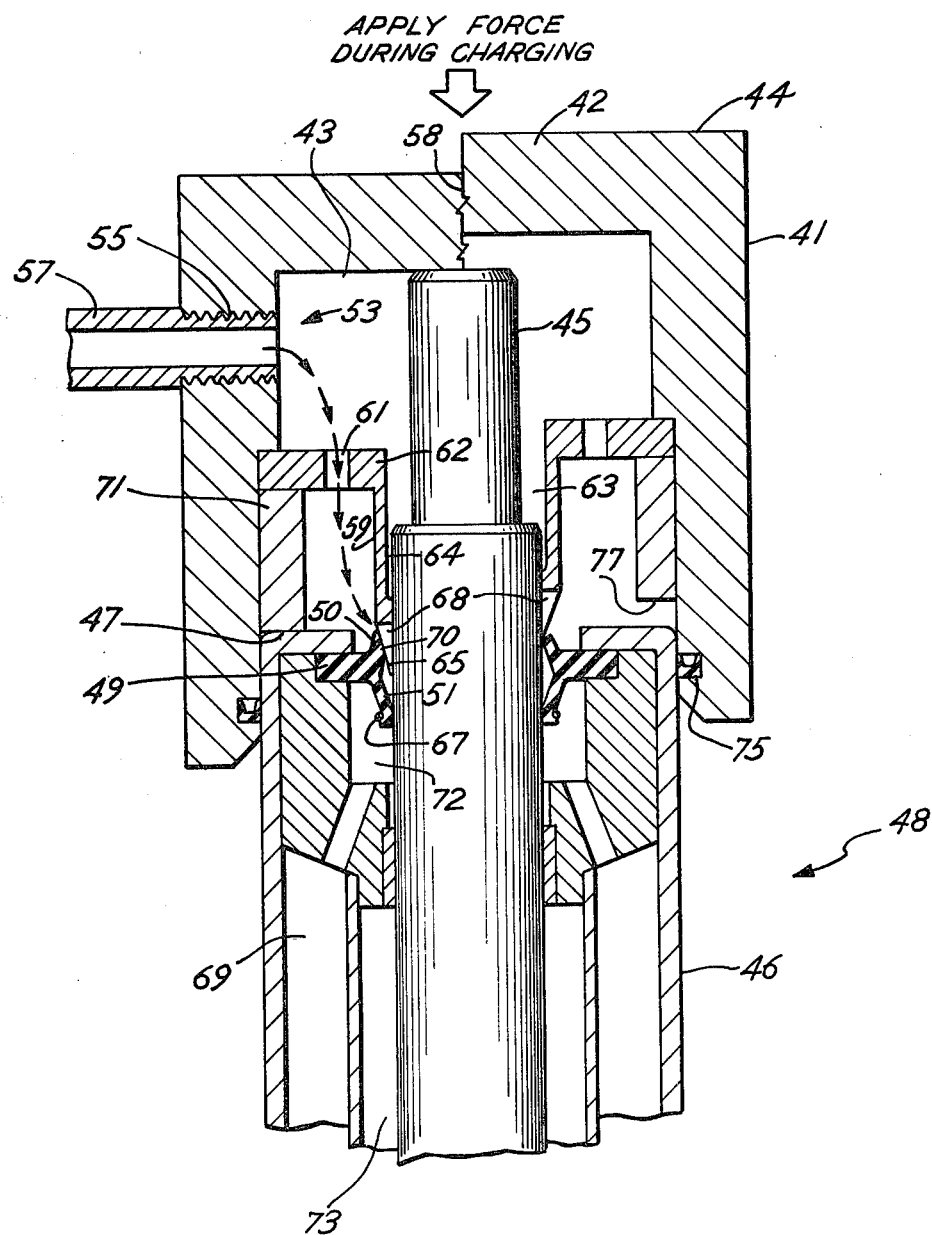

METHOD AND APPARATUS FOR PRESSURIZING HYDROPNEUMATIC SHOCK ABSORBERS

REFERENCE TO RELATED APPLICATION

This is a continuation-in-part application of co-pending U.S. patent application S.N. 398707, filed 15 July 1982, now abandoned, which was a continuation-in-part of U.S. patent application S.N. 389598, filed 18 June 1982, now abandoned.

BACKGROUND OF THE INVENTION

The invention relates to a gas charging device for hydropneumatically pressurizing a vehicle suspension fluid spring or damper such as an air spring shock absorber or a MacPherson strut, and more particularly relates to a gas charging device which mechanically deflects a gas seal for introducing gas under pressure to the damping chambers of a vehicle damper.

Heretofore, shock absorbers and struts have been pressurized by drilling a hole in the outer wall of the shock cylinder. After pressurizing the cylinder through the drilled passage, the passage is sealed by pressing a plug or ball into the drilled passage. Alternatively, the passage may be sealed by welding after the passage has been closed by the plug.

This method requires several operations such as drilling and welding which, at best, impose additional expenses and the chance that metal chips or weld contaminants may be introduced in the damper assembly.

Another method of pressurizing vehicle dampers utilizes excessively high gas pressure over the piston rod seal to displace the seal and force the gas past the seal and into the chamber. Such a method makes control of the final pressure level within the damper rather difficult. The final internal pressure depends on many variables such as, the preload on the seal by the retention spring of the damper, the interface between the sealing face of the seal and the piston rod, as well as other variables.

SUMMARY OF THE INVENTION

It is therefore an object of the present invention to provide an improved gas charging apparatus for use with vehicle dampers or springs.

It is yet another object of the present invention to provide a charging head for use with vehicle dampers which easily controls the final internal gas pressure level within the damper body.

These and other objects of the invention are accomplished in a gas charging head which is fitted atop the piston rod of a vehicle damper spring. A force is applied to the charging head driving the piston rod back within the damper/spring cylinder. As the piston rod moves into the cylinder, a seal penetrating device associated with the head displaces the upper portion of the piston rod seal. An pathway is formed in the penetrating device for communicating with a pressurized cavity in the charging head supplying gas under pressure to the damper/spring.

BRIEF DESCRIPTION OF THE DRAWINGS

FIG. 1 illustrates in general cross section an embodiment of a gas charging fixture of the present invention, in association with a vehicle damper.

FIG. 2 illustrates a cross section of another embodiment of a gas charging fixture of the present invention.

DESCRIPTION OF THE PREFERRED EMBODIMENT

Referring to FIG. 1, a gas charging head 11 includes a cavity 13 for receiving the piston rod 15 of a conventional MacPherson strut, or other vehicle suspension damper, generally referred to by reference numeral 17. As will suggest itself, strut 17 may be an air or hydraulic spring; however, the preferred embodiment will be described herein in relation to a strut 17. Strut 17 includes a piston rod seal 33 having a pair of lip portions 37, 39 which bear against piston rod 15 to seal a gas under pressure within the strut while permitting movement of the piston rod relative to the seal. The seal is formed from a flexible material, as understood.

Charging head 11 is formed with a passageway 19 for communicating with cavity 13. The walls of passageway 19 are ribbed or threaded as indicated by reference numeral 21 so as to receive a gas pressurizing nozzle 23. Nozzle 23 supplies gas under pressure from a pressure source (not shown) into cavity 13 via passageway 19.

Cavity 13 is generally cylindrical in shape, as shown, being formed with a funnel shaped top portion 14 against which the top piston rod 15 abuts. The funnel shaped top portion of the cavity generally aligns the vertical axis of the piston rod with the vertical axis of charging head 11.

Charging head 11 includes a generally cylindrical top portion 24, within which cavity 13 is formed. Top portion 24 carries a top flat surface 26 against which a force is applied for driving the piston rod and charging head relative to the body of the strut.

A seal penetrating member 25 is formed integral to top portion 24 and depends downwardly therefrom as illustrated in FIG. 1. Penetrating member 25 is shown cut away on the left side of the piston rod to illustrate the penetrating member relative to seal 33 when the piston rod is extended outward from the strut. On the right side of the piston rod, the penetrating member is shown relative to seal 33 when the piston rod is driven within the strut.

Seal penetrating member 25 is cylindrically shaped and includes an inner cylindrical cavity 27 which communicates directly with cavity 13 as shown. The radial dimension of cavity 27 is slightly larger than piston rod 15 in order to receive the rod and form an annular passageway 29 between the rod and the inside surface of penetrating member 25.

As understood, the particularly shape of piston rod 15 dictates the relative size of cavities 13, 27. The piston rod shown in FIG. 1 includes two coaxial portions of different diameters. As will suggest itself, cavities 13, 27 may have the same diameter.

Seal penetrating member 25 includes a tip portion 31 formed at its lower end by inwardly tapering the lower portion of the outer cylindrical surface of the penetrating member 25. As the piston rod is retracted within strut 17, tip portion 31 is moved against piston rod seal 33 deflecting the lip portions 37 and 39 of seal 33 radially away from piston rod 15 permitting the penetrating member to pass between the the lip portions and the piston rod. Lip portions 37 and 39 bear against the external cylindrical surface of penetrating member 25 effecting a seal at the contact locations. As understood, a conventional spring member 34 may be included in the strut structure to bias seal 33 toward piston rod 15.

Pressurized gas is fed to cavity 13 via passageway 19 and nozzle 23. From cavity 13 the pressurized gas moves into cavity 27, down annular passageway 29 and into the damper fluid reservoir 35. When a desired internal pressure is established within the reservoir, the piston rod and penetrator head assembly is extended outwardly from the strut, causing piston rod seal lip 39 to return to the piston rod surface sealing the gas within the strut. Further withdrawal of the penetrating member 25 permits seal lip 37 to reestablish sealing contact with the piston rod surface to exclude contaminants.

Referring to FIG. 2, another embodiment is shown. A charging head 41 includes a cavity 43 for receiving piston rod 45 of a MacPherson strut, or other vehicle suspension damper, generally referred to by a reference number 48. Strut 48 includes an elastomeric lip seal 49 having a pair of lip portions 50, 51 which bear against piston rod 45 to seal a gas under pressure within strut 48 while permitting movement of piston rod 45 relative to seal 49.

Charging head 41 is formed with a passageway 53 for communicating with cavity 43. The walls of passageway 53 are ribbed or threaded as indicated by reference numeral 55 so as to receive a gas pressurizing nozzle 57. Nozzle 57 supplies gas under pressure from a pressure source (not shown) into cavity 43 via passageway 53.

Gas charging head 41 includes a generally cylindrical top portion 42, within which cavity 43 is formed. Top portion 42 carries a top flat surface 44 against which a force is applied for driving piston rod 45 and charging head 41 relative to the body of the strut 48.

A seal penetrating member 59 may be formed of nylon and depends downwardly from top portion 42, as shown. The charging head is drawn broken at 58 for illustrating seal penetrating member 59 (on the right side of the piston rod 45) relative to seal 49 when the piston rod 45 extended outward from the strut 48. On the left side of the piston rod 45, the seal penetrating member 59 is shown relative to seal 49 when piston rod 45 is driven within the strut 48.

Seal penetrating member 59 is cylindrically shaped including an inner cylindrical cavity 63 communicating directly with cavity 43. The radial dimension of cavity 63 is slightly larger than piston rod 45 in order to receive the rod and forming a slight annular passageway 64 between the rod and the inside surface of penetrating member 59.

Penetrating member 59 extends downwardly from a circular raidal flange section 62 which extends horizontally across cavity 43. Flange section 62 is secured to top portion 42 forming the lower extremity of cavity 43. One or more circular gas passages 61 are formed through flange section 62 as shown.

Seal penetrating member 59 includes a tip portion 65 formed at its lower end by inwardly tapering the lower portion of the outer cylindrical surface of the penetrating member 59.

As understood, the particular shape of piston rod 45 dictates the relative size of cavities 43, 63. The piston rod shown in FIG. 2 includes two coaxial portions of different diameters.

When the charging head 41 is forced down over the upper portion of the intermediate cylinder 46 of strut 48, as shown on the left side of FIG. 2, the penetrating member 59 engages the upper portion 50 of lip seal 49. A head stop 71 is bottomed against the top circumferential surface 47 of strut 48 to control the distance of penetration of penetrating member 59.

Stop 71 may be a solid cylindrical member secured to charging head 41 and providing a lower stop surface 77 against which top 47 of strut 48 abuts. As will suggest itself, stop 71 may be formed of a plurality of solid members rather than a single cylindrical member.

The penetrating member 59 causes only the upper portion 50 of seal 49 to move away from the surface of the piston rod 45 and not the lower portion 51. Pressurized gas is then permitted to flow into the charging head 41. Gas is prevented from leaking to the exterior of the head 41 by a head-to-cylinder cup seal 75.

Circumferentially spaced slots 68 are formed in the bottom edge 70 of the penetrating member 59. A cross-section of a slot 68 is identified by triangle 68. Slots 68 provide a gas path around sealing lip 50 permitting gas to move from apertures 61 to immediately above sealing lip 51 of the seal 49. Thus, a gas path is formed from pressurizing nozzle 57, through apertures 61, through slots 68 and against the back side of sealing lip 51 for forcing lip 51 away from the surface of piston rod 45.

The lip portion 51 may be manufactured with a garter spring 67 surrounding the lip 51. The garter spring 67 urges the lip 51 of the seal 59 into contact with the surface of the piston rod 45.

The force generated by the pressurized gas acting on the back side of the sealing lip 51 overcomes the sealing force of the lip material and the force contribution of the garter spring 67. Pressurized gas then flows into a cavity 72 of the strut immediately below seal 49 and pressurizes a reservoir 69 and a damping chamber 73 connected thereto.

When the charging pressure is reduced, the pressure in the chamber 73 in conjunction with the force of the garter spring 67 and lip seal 49 reestablishes a seal at the surface of piston rod 45. The seating force is then removed from the top surface 44 of charging head 41 and head 41 is removed from the upper portion of the strut 48.

It is also possible to accomplish the charging of strut 48 through the upper portion 50 of the single lip seal 49 using less than a 360 degree cylindrical section of penetrating member 59 and flange 62; in which case it is not necessary to have gas passages 61 formed in the flange section 62, nor the radially spaced slots 68 in the bottom edge 70 of penetrating member 59. Such a penetrating member entering the upper portion 50 of seal 49 will deform the seal material in upper portion 50 forming gas passages at each vertical edge of the arcuate penetrating member 59.

It is to be understood, of course, that the foregoing describes a preferred embodiment of the present invention and that modifications may be made therein without departing from the spirit or scope of the present invention as set forth in the appended claims.

What is claimed:
1. Apparatus for introducing a gas under pressure to a pressurized, piston receiving device, the device having a working chamber, a cylindrical piston rod extending out from the working chamber and a lip seal preventing the pressurizing gas within the chamber from leaving the rod end portion of the chamber as the piston rod moves operably with respect to said seal and chamber, said seal having an upper portion and a lower lip portion, the apparatus comprising:
   head means including a first chamber for receiving the top of the piston rod, said head means for receiving a force to apply a corresponding force to the piston rod moving the piston rod into the chamber;

gas inlet means including an opening formed in said head means and communicating with said first chamber, said gas inlet means for receiving gas under pressure into said first chamber;

seal penetrating means connected with said head means and including a bottom edge said bottom edge having gas pathway means formed therein for passing gas within said bottom edge;

a tip structure formed at said bottom edge of said penetrating means for contacting the upper portion of said lip seal as the seal penetrating means is moved relative to the lip seal, said tip structure forcing said upper portion outwardly from the piston rod permitting movement of the penetrating means between the upper portion and the piston rod and permitting said gas under pressure to flow past said upper portion via said gas pathway means, whereby said gas is operative to generate sufficient force to move said lower lip portion out of sealing engagement with said piston rod, thereby facilitating pressurization of said working chamber.

2. Apparatus according to claim 1 wherein said tip structure includes a tapered surface leading from the inner surface of said penetrating means.

3. Apparatus according to claim 1 wherein said head means includes a flat, top, horizontal surface lying perpendicular to the axis of the piston rod when said second chamber receives the piston rod, said horizontal surface for receiving the first named force.

4. Apparatus according to claim 1 and further including a head stop for bottoming against top circumferential edge, said head stop controlling the distance of penetration of said penetration means.

5. Apparatus according to claim 1 including a garter spring around the lower lip portion of said seal, said garter spring urging said lip portion into contact with the surface of said piston rod.

6. Apparatus according to claim 1 and further including a radial flange structure disposed within said head means and connecting said head means to said penetrating means, said radial flange including gas passage means for passing said gas under pressure from said first chamber.

7. Apparatus according to claim 6 wherein said seal penetrating means includes a second chamber of cylindrical shape of a diameter slightly larger than the diameter of the piston rod for receiving the piston rod.

* * * * *